US008753108B2

(12) United States Patent
Ajhar et al.

(10) Patent No.: US 8,753,108 B2
(45) Date of Patent: Jun. 17, 2014

(54) METHOD AND APPARATUS FOR TREATMENT OF UNBURNTS

(75) Inventors: Marc Ajhar, Wiesbaden (DE); Jörgen Grubbström, Vaxjo (SE)

(73) Assignee: ALSTOM Technology Ltd, Baden (CH)

( * ) Notice: Subject to any disclaimer, the term of this patent is extended or adjusted under 35 U.S.C. 154(b) by 67 days.

(21) Appl. No.: 13/435,908

(22) Filed: Mar. 30, 2012

(65) Prior Publication Data

US 2013/0255550 A1    Oct. 3, 2013

(51) Int. Cl.
*B01D 53/62* (2006.01)
*B01D 53/74* (2006.01)
*B01J 19/00* (2006.01)
*F23G 7/06* (2006.01)
*F23J 15/00* (2006.01)

(52) U.S. Cl.
USPC ........ 431/3; 431/5; 431/7; 422/187; 422/620; 423/220; 423/437.1; 423/245.3; 423/246; 423/247

(58) Field of Classification Search
USPC .............. 431/3, 5, 7; 422/187, 620; 423/220, 423/437.1, 245.3, 246, 247
See application file for complete search history.

(56) References Cited

U.S. PATENT DOCUMENTS

| 8,486,361 B2 * | 7/2013 | Bialkowski et al. ....... 423/437.1 |
| 2011/0198861 A1 | 8/2011 | Jallais et al. |
| 2011/0223083 A1 | 9/2011 | Bialkowski et al. |
| 2012/0214106 A1 * | 8/2012 | Sit et al. ............................ 431/7 |

FOREIGN PATENT DOCUMENTS

WO    2010/099555    9/2010

OTHER PUBLICATIONS

International Search Report and Written Opinion for PCT/IB2013/052469 mailed Jan. 7, 2014.
Lyngfelt et al., "*A fluidized-bed combustion process with inherent $CO_2$ separation; application of chemical-looping combustion*", Chemical Engineering Science, vol. 56, Jan. 2001, pp. 3101-3103.
Mattisson et al., "*Reactivity of some metal oxides supported on alumina with alternating methane and oxygen-application for chemical looping combustion*", Energy and Fuels, vol. 17, Jan. 2003, pp. 643-651.
Hossain et al., "*Chemical-looping combustion (CLC) for inherent $CO_2$ separations—a review*", Chemical Engineering Science, vol. 63, May 2008, pp. 4433-4451.
Adanez et al., "*Progress in chemical-looping combustion and reforming technologies*", Progress in Energy and Combustion Science, vol. 38, No. 2, Sep. 2012, pp. 215-282.

* cited by examiner

*Primary Examiner* — Timothy Vanoy
(74) *Attorney, Agent, or Firm* — Robert D. Crawford

(57) ABSTRACT

A method and apparatus for treatment of unburnts in a flue stream 9 of a chemical looping combustion system. Unburnts present in the flue stream 9 are treated after $CO_2$ is removed from the flue stream in a gas processing unit 13. As shown in FIG. 2, oxidation of the unburnts occurs primarily in an air reactor 2 in the presence of air 1, allowing the system to maintain $CO_2$ capture effectiveness and removing the need for creation of enriched or pure oxygen 11.

18 Claims, 4 Drawing Sheets

METHOD AND APPARATUS FOR TREATMENT OF UNBURNTS

FIELD

The present disclosure relates to treatment of unburnts in chemical looping combustion. More particularly, it relates to an efficient method and apparatus to oxidize unburnts while reducing the energy consumption or energy loss.

BACKGROUND

Certain processes, such as combustion of carbon containing fuels, produce gaseous emissions of carbon dioxide ($CO_2$). $CO_2$ has been identified as a "greenhouse" gas, which appears to contribute to global warming. Because of its status as a "greenhouse" gas, technologies have been developed to prevent large quantities of $CO_2$ from being released into the atmosphere from the use of fossil fuels.

Chemical looping combustion (CLC) is a combustion technology that provides efficient $CO_2$ capture and processing. CLC provides for inherent separation of $CO_2$ produced during oxidation of carbon containing fuels thereby creating a more concentrated stream of $CO_2$. By increasing the concentration of the $CO_2$ in the flue stream as part of the combustion technology, the energy and capital expenditures required to separate $CO_2$ after combustion for capture and storage are substantially reduced.

CLC technology generally involves use of an oxygen carrier which transfers oxygen from air to a fuel, thereby avoiding direct contact between air and the fuel. Two inter-connected reactors, typically fluidized beds, are used in the process: a fuel reactor and an air reactor. The fuel is introduced in the fuel reactor, which contains the oxygen carrier such as a metal oxide, MeO. Depending on the fuel and the metal oxide, the fuel and the metal oxide may react according to the following reaction:

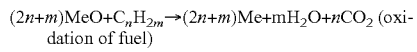
(2n+m)MeO+C$_n$H$_{2m}$→(2n+m)Me+mH$_2$O+nCO$_2$ (oxidation of fuel)

An exit gas stream from the fuel reactor primarily contains products from oxidation of the fuel, $H_2O$ and $CO_2$. A stream consisting of a high concentration of $CO_2$ may then be obtained by condensing the $H_2O$ contained in the exit gas stream of the fuel reactor.

A reduced metal oxide, Me, formed as part of fuel oxidation reaction, may be transferred to the air reactor where it may oxidize according to the following reaction:

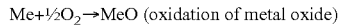
Me+½O$_2$→MeO (oxidation of metal oxide)

A flue stream exiting the air reactor consists primarily of non-reactive components of air, such as nitrogen, the metal oxide and some unused oxygen. Through the use of the oxygen carrier to deliver oxygen to the fuel reactor, the non-reactive components of air are expelled from the system as they exit the air reactor and are never introduced into the fuel reactor. Therefore, the products of combustion, primarily $CO_2$ and $H_2O$, are not diluted by non-reactive components of air in the flue stream of the fuel reactor.

Depending on the conditions and materials used, combustion of the fuel in the fuel reactor may be incomplete. Incomplete combustion may cause unburnts, such as hydrogen, methane, and carbon monoxide, to be present in the flue stream of the fuel reactor. In order to reduce or eliminate the unburnts from the flue stream, the unburnts are typically oxidized in a post combustion unit after combustion in the fuel reactor. The unburnts should not be returned completely to the fuel reactor for combustion because this may lead to an accumulation of non-reactive matter within the combustion system.

One of the difficulties with CLC is that the post combustion unit requires pure or enriched oxygen gas for oxidation of the unburnts. If air was added to the flue stream exiting the fuel reactor for purposes of post combustion oxidation, the benefits of CLC would be lost because the non-reactive constituents of air would be added to the flue stream. Accordingly, post combustion oxidation requires the addition of pure or oxygen enriched gas, which is expensive both in terms of energy consumption and capital costs. Moreover, depending on the amount of unburnts requiring oxidation, combustion in pure or enriched oxygen may lead to strongly elevated temperatures, requiring cooling. Accordingly, there is a need for an improved method and apparatus for more efficient treatment of unburnts.

SUMMARY

According to the aspects illustrated herein, there is provided a method of oxidizing unburnts in a chemical looping combustion system, including transmitting a flue stream of a fuel reactor to a gas processing unit, removing $CO_2$ from the flue stream in the gas processing unit, transmitting a portion of a flue stream of the gas processing unit to an air reactor, and oxidizing unburnts contained in the portion of the flue stream of the gas processing unit with air in the air reactor.

According to other aspects illustrated herein, there is provided a method to oxidize unburnts in a flue stream, including transmitting the flue stream containing the unburnts to an air reactor of a chemical looping combustion system and oxidizing the unburnts in the air reactor in the presence of air.

According to other aspects illustrated herein, there is provided an apparatus for oxidation of unburnts, including an air reactor, a fuel reactor connected to the air reactor, and a gas processing unit connected to the fuel reactor. The flue stream of the fuel reactor is transmitted to the gas processing unit. The unburnts are present in the flue stream of the gas processing unit. A portion of a flue stream of the gas processing unit is injected into the air reactor.

BRIEF DESCRIPTION OF THE DRAWINGS

Referring now to the figures, which are exemplary embodiments, and wherein the like elements are numbered alike.

DETAILED DESCRIPTION

Figure 1:
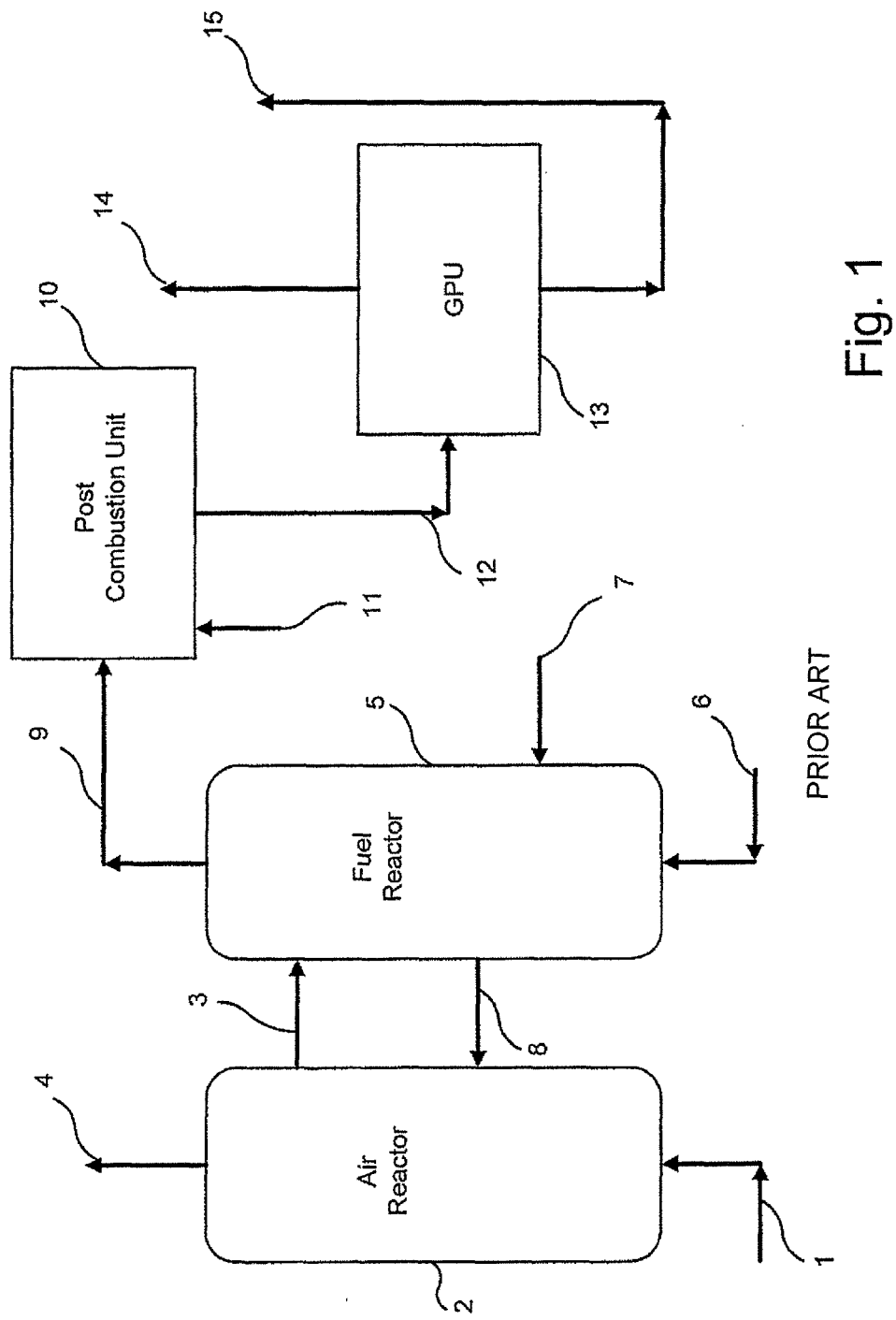
FIG. 1 is a schematic flow diagram of a typical chemical looping combustion system.

According to an exemplary embodiment of the present disclosure, an efficient method is provided for treatment of unburnts in a chemical looping combustion (CLC) system. A method is provided that reduces the energy requirements of oxidation of the unburnts prior to venting of flue gases to the atmosphere. CLC is utilized to oxidize a fuel in a fuel reactor. Fuel oxidation is accomplished by contacting the fuel with a metal oxide formed in an air reactor. Oxidation of the fuel in the fuel reactor may leave a portion of the fuel incompletely oxidized, leaving unburnts in a flue stream of the fuel reactor.

By removing $CO_2$ from the flue stream in a gas processing unit (GPU) and then transmitting at least a fraction of the flue stream, containing unburnts and non-reactive components of air (inerts), to an air reactor, the unburnts may be efficiently oxidized without the need for cryogenically produced oxygen, substantially reducing the energy demands for removal of unburnts from a CLC system.

According to an exemplary embodiment of the present disclosure, a method is provided for oxidation of unburnts in a flue stream. A flue stream containing the unburnts may be transmitted to an air reactor of a CLC system. Oxidation of the unburnts occurs in the air reactor in the presence of air. By oxidizing unburnts in the air reactor, the benefits of CLC on $CO_2$ capture are substantially maintained and the energy required to produce pure or enriched oxygen gas is avoided, increasing efficiency of the system.

According to an exemplary embodiment of the present disclosure, an apparatus is provided for oxidation of unburnts. An apparatus is provided having an air reactor, a fuel reactor connected to the air reactor, and a gas processing unit connected to the fuel reactor. A flue stream of the fuel reactor is configured to transmit to the gas processing unit for $CO_2$ removal before being further transmitted, in part, to the air reactor. Oxidation of the unburnts occurs, in part, in the air reactor in the presence of air.

Embodiments of the present disclosure reduce energy and capital costs of CLC by efficiently oxidizing unburnts potentially present in CLC. A flue stream of a fuel reactor is transmitted such that $CO_2$ is first removed and captured for storage and a $CO_2$ reduced flue stream is transmitted to an air reactor for complete combustion without the addition of pure or enriched oxygen gas. Alternatively, the $CO_2$ reduced flue stream is transmitted to a post combustion unit, which may be supplied by air. Oxidation of the unburnts may occur in the post combustion unit prior to transmission of the $CO_2$ reduced flue stream to the air reactor. Any heat produced in the post combustion unit may be recovered in the air reactor. In another alternative, a portion of the $CO_2$ reduced flue stream may be transmitted to the fuel reactor, said portion being less than 100% of the $CO_2$ reduced flue stream, with a remaining portion of the $CO_2$ reduced flue stream being transmitted to the air reactor. In another embodiment, the $CO_2$ reduced flue stream may be processed into two streams, one entering the fuel reactor and the other entering the air reactor. The $CO_2$ reduced flue stream coming from the GPU may be pressurized, facilitating a separation process. For example, membranes may be used to separate the $CO_2$ reduced flue stream into one stream consisting of a higher percentage of unburnts, which may be transmitted to the fuel reactor, and one stream consisting of a higher percentage of inerts, which may be transmitted to the air reactor.

Referring to FIG. 1, CLC typically includes an air reactor 2 and a fuel reactor 5, which may be fluidized bed reactors, wherein a fuel 7 is injected into the fuel reactor 5 and wherein the fuel reactor 5 is further injected with a metal oxide 3 formed in the air reactor 2. One example of the fuel is coal. Other examples include, but are not limited to, natural gas, synthetic gas (syngas), and petroleum refinery gas. The metal oxide employed may be any of the typical metal oxides used for CLC, including nickel oxide, calcium oxide, iron oxide, copper oxide, manganese oxide, cobalt oxide and mixtures hereof as examples.

Combustion of the fuel 7 in the fuel reactor 5 produces a flue stream 9. The flue stream 9 contains products of combustion, $CO_2$ and $H_2O$, and may also include unburnts, such as carbon monoxide, hydrogen, or methane. The unburnts may be oxidized in a post combustion unit 10 which may further receive a stream of pure or oxygen-enriched gas 11. The stream of pure or oxygen-enriched gas 11 is supplied to the post combustion unit 10 instead of air to prevent diluting of the $CO_2$ concentration in the flue stream 9 before it reaches a gas processing unit (GPU) 13. After post-combustion oxidation, a flue stream 12 of the post combustion unit 10 may be transmitted to the GPU 13. The GPU 13 condenses and liquefies $CO_2$ present in the flue stream 12 and the $CO_2$ may be transmitted 14 for use or storage. After removal of the $CO_2$, a $CO_2$ reduced flue stream 15 may be vented via an exhaust stack.

Figure 2:
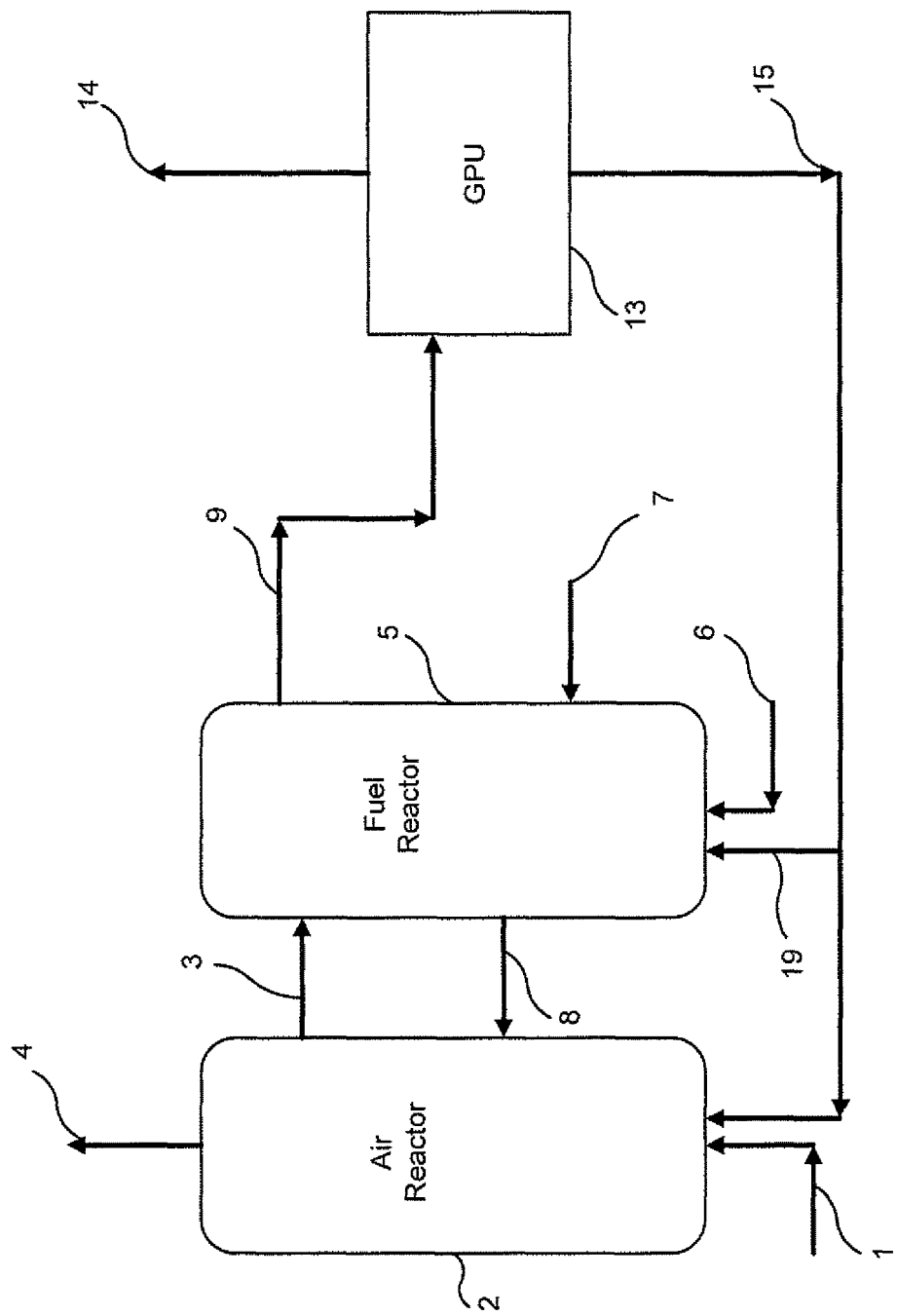
FIG. 2 is a schematic flow diagram of an exemplary embodiment of the present disclosure.

Referring to the exemplary embodiment shown in FIG. 2, the flue gas stream 9 exiting the fuel reactor may be transmitted directly to the GPU without first oxidizing the unburnts in the post combustion unit 10. The GPU 13 removes $CO_2$ present in the flue stream 9 and the $CO_2$ may be transmitted 14 for use or storage. After $CO_2$ capture in the GPU 13, the $CO_2$ reduced flue stream 15, which may contain unburnts, may be transmitted to an air reactor 2. The air reactor 2 is further injected with air 1 such that oxidation of the unburnts may occur in the air reactor 2. Heat generated from the oxidation of the unburnts may be used for generation of electricity. The air reactor 2 also receives a reduced metal oxide 8 from the fuel reactor 5. The reduced metal oxide 8 may be oxidized by the air 1 in the air reactor 2, forming a metal oxide 3. The metal oxide 3 may be transmitted to the fuel reactor 5, which may further receive steam 6 or partly recirculated flue gas at various purification stages (9, 12, 14) for fluidization purposes. Off gases of the air reactor 2, which may include oxidation products from the oxidation of the unburnts, may be vented to the atmosphere 4.

In order to preserve the $CO_2$ capture benefits of CLC, the post-combustion unit 10 of a typical CLC system must be supplied with the pure or oxygen-enriched gases 11, requiring energy and capital expenditures. By oxidizing at least a fraction of the unburnts in the air reactor instead of employing the post-combustion unit to complete oxidation, the present disclosure avoids the costs and energy demands required to operate a post-combustion unit. Thus the present disclosure provides an efficient process for the treatment of unburnts for use in connection with CLC technology.

Referring further to the exemplary embodiment shown in FIG. 2, a portion 19 of the $CO_2$ reduced flue stream 15 may be diverted directly to the fuel reactor 5. Oxidation of unburnts contained in the portion 19 may occur in the fuel reactor 5. The portion 19 must be less than 100% of the flue stream 15 so that inerts may be purged from the system through the air reactor. Diverting the portion 19 to the fuel reactor may increase $CO_2$ capture efficiency of the system.

Figure 3:
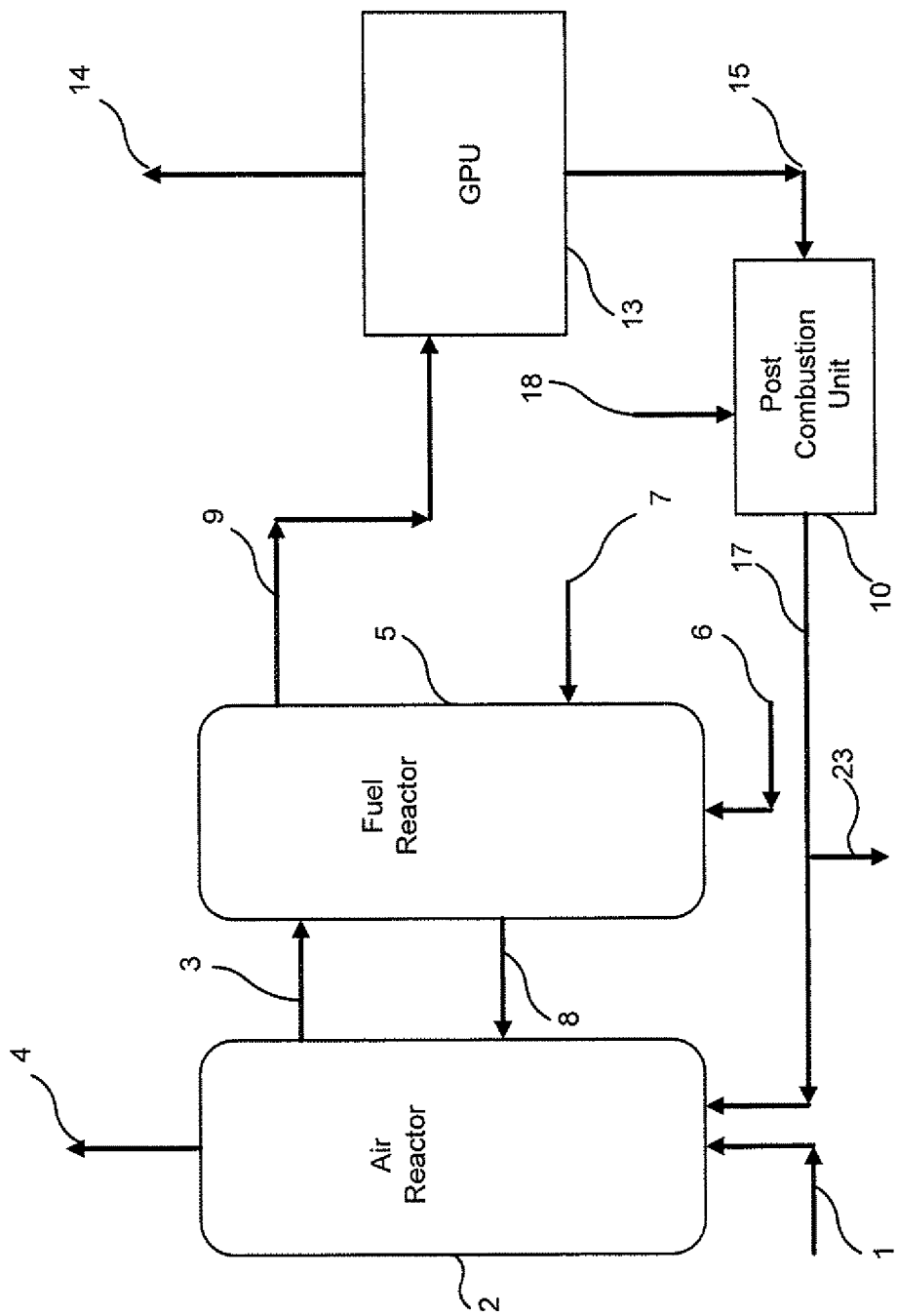
FIG. 3 is a schematic flow diagram of another exemplary embodiment of the present disclosure.

Referring to the exemplary embodiment shown in FIG. 3, the $CO_2$ reduced flue stream 15, which may contain the unburnts, may be transmitted to the post-combustion unit 10 supplied by an air stream 18 such the oxidation of the unburnts occurs in the presence of air prior to transmission to the air reactor 2. In this exemplary embodiment, the post-combustion unit does not require pure or enriched oxygen gases because the capture and removal of $CO_2$ has already occurred in the GPU 13. A flue stream 17 from the post-combustion unit 10 may be transmitted to the air reactor 2. Alternatively, a portion 23 of the flue stream 17 from the post-combustion unit 10 may be vented to the atmosphere. The heat produced from oxidation of unburnts in the post-combustion unit 10 may also be transmitted to the air reactor 2 or indirectly to the fuel reactor 5 such that temperatures of the system may be more accurately maintained and the heat may be used in the production of electricity.

Figure 4:
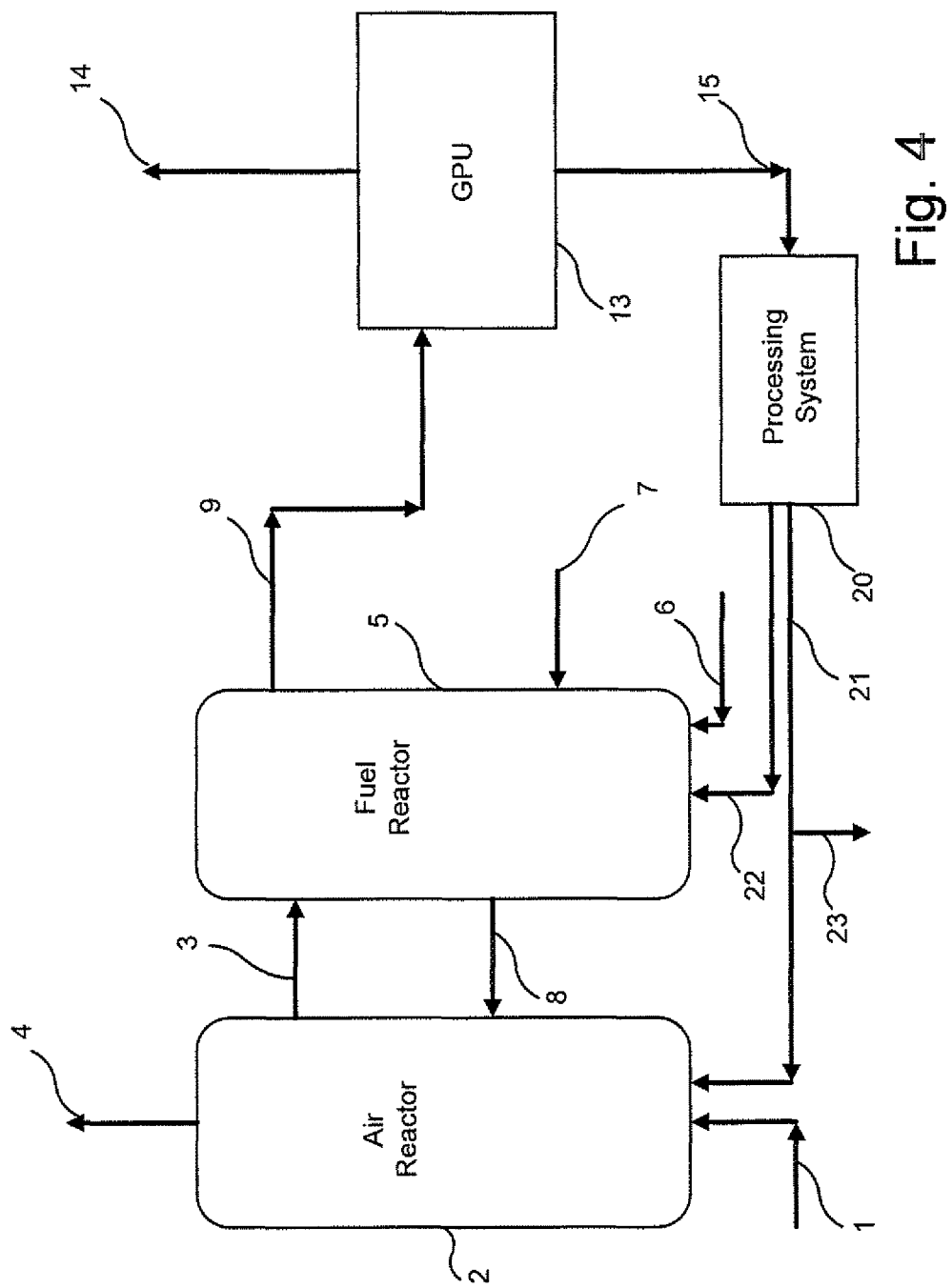
FIG. 4 is a schematic flow diagram of another exemplary embodiment of the present disclosure.

Referring to the exemplary embodiment shown in FIG. 4, the $CO_2$ reduced flue stream 15, which may contain unburnts, may be transmitted to a processing system 20, which may be a membrane system. The processing system 20, may produce two streams. A first stream 22 of the processing system 20 may be enriched with unburnts and CO2 and may be transmitted to the fuel reactor 5. A second stream 21 of the processing system 20 may be of higher concentration of inerts (notably nitrogen) and may be transmitted to the air reactor 2 or vented 23. Transmitting the first stream 22 to the fuel reactor allows for oxidation of the unburnts in the fuel reactor and recovery of $CO_2$ in the GPU 13. Venting or transmitting the second stream 21 to the air reactor 2 allows the system to expel inerts. Unburnts in both streams 21 and 22 release energy upon oxidation producing heat that can be recovered for electricity generation.

By transmitting the flue stream of the fuel reactor of CLC technology at least in part to the air reactor or a separate air-operated post-combustion unit after $CO_2$ removal, the present disclosure provides an efficient method for the oxidation of unburnts. In one aspect, the present disclosure utilizes the air reactor to provide oxidation of the unburnts, thereby eliminating the need for the post combustion unit supplied by pure or enriched oxygen gas. In another aspect, the present disclosure recovers the heat generated during oxidation of the unburnts in the post-combustion unit by transmitting the heat back to the air reactor only or to both air and fuel reactors. In another aspect, the present disclosure separates unburnts and $CO_2$ from inerts (mainly nitrogen) and transmits the unburnts and $CO_2$ to the fuel reactor while transmitting the inerts to the air reactor. Thus, aspects of the present disclosure provide an efficient process for the treatment of unburnts in CLC technology by reducing the capital and energy requirements of pure or oxygen-enriched gas generation typically required for oxidation of the unburnts, thus increasing efficiency of $CO_2$ capture, or by recovering the heat released from the oxidation of the unburnts.

While the invention has been described with reference to various exemplary embodiments, it will be understood by those skilled in the art that various changes may be made and equivalents may be substituted for elements thereof without departing from the scope of the invention. In addition, many modifications may be made to adapt a particular situation or material to the teaching of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method of oxidizing unburnts in a chemical looping combustion system, comprising:
   transmitting a flue stream of a fuel reactor containing unburnts to a gas processing unit;
   removing $CO_2$ from the flue stream in the gas processing unit;
   transmitting the flue stream of the gas processing unit to a post combustion unit;
   transmitting a portion of a flue stream of the post combustion unit to an air reactor; and
   oxidizing unburnts contained in the portion of the flue stream of the post combustion unit with air in the air reactor.

2. The method of claim 1, further comprising:
   transmitting a portion of the flue stream of the gas processing unit to the fuel reactor.

3. The method of claim 1, further comprising:
   injecting air into the post combustion unit to oxidize unburnts.

4. A method of oxidizing unburnts in a chemical looping combustion system, comprising:
   transmitting a flue stream of a fuel reactor containing unburnts to a gas processing unit;
   removing $CO_2$ from the flue stream in the gas processing unit;
   transmitting the flue stream of the gas processing unit first to a processing system;
   transmitting a portion of a flue stream of the processing system to an air reactor; and
   oxidizing unburnts contained in the portion of the flue stream of the processing system with air in the air reactor.

5. The method of claim 4, wherein the processing system is a membrane system.

6. The method of claim 4, comprising:
   separating the flue stream of the gas processing unit into two streams such that a first stream has a higher concentration of unburnts and a second stream as a higher concentration of inerts.

7. The method of claim 6, comprising:
   transmitting the first stream from the processing system to the fuel reactor.

8. The method of claim 6, comprising:
   transmitting the second stream from the processing system to the air reactor.

9. A method to oxidize unburnts in a flue stream, comprising:
   removing $CO_2$ from a flue stream containing the unburnts in a gas processing unit prior to transmitting the flue stream to an air reactor;
   transmitting a flue stream of the gas processing unit containing the unburnts to a post combustion unit;
   transmitting the flue stream containing the unburnts of the post combustion unit to the air reactor of a chemical looping combustion system; and
   oxidizing the unburnts in the air reactor in the presence of air.

10. The method of claim 9, comprising:
    transmitting a portion of the flue stream containing the unburnts to a fuel reactor of a chemical looping combustion system.

11. A method to oxidize unburnts in a flue stream, comprising:
    removing $CO_2$ from a flue stream containing the unburnts in a gas processing unit prior to transmitting the flue stream to an air reactor;
    transmitting a flue stream of the gas processing unit containing the unburnts to a processing system;
    transmitting the flue stream containing the unburnts of the processing system to the air reactor of a chemical looping combustion system; and
    oxidizing the unburnts in the air reactor in the presence of air.

12. An apparatus for oxidation of unburnts, comprising:
    an air reactor;
    a fuel reactor connected to the air reactor;
    a gas processing unit connected to the fuel reactor; wherein a flue stream of the fuel reactor is transmitted to the gas processing unit;
    a post combustion unit connected to the gas processing unit, wherein the post combustion unit is connected to the air reactor, and wherein a portion of a flue stream of the gas processing unit is injected into the air reactor; and wherein the unburnts are present in the flue stream of the gas processing unit.

13. The apparatus of claim 12, wherein the post combustion unit is further connected to the fuel reactor such that a portion of the flue stream of the gas processing unit transmits to the fuel reactor.

14. An apparatus for oxidation of unburnts, comprising:
an air reactor;
a fuel reactor connected to the air reactor;
a gas processing unit connected to the fuel reactor; wherein a flue stream of the fuel reactor is transmitted to the gas processing unit; and;
a processing system connected to the gas processing unit, wherein the processing system is connected to the air reactor, and wherein a portion of a flue stream of the gas processing unit is injected into the air reactor, and the unburnts are present in the flue stream of the gas processing unit.

15. The apparatus of claim 14, wherein the processing system is a membrane system.

16. The apparatus of claim 14, wherein the processing system is configured to separate the flue stream of the gas processing unit into two streams such that a first stream has a higher concentration of unburnts and a second stream as a higher concentration of inerts.

17. The apparatus of claim 16, wherein the processing system is configured to transmit the first stream from the processing system to the fuel reactor.

18. The apparatus of claim 16, wherein the processing system is configured to transmit the second stream from the processing system to the air reactor.

* * * * *